May 28, 1935.  J. H. BALDWIN  2,002,518
POWER DRIVEN VEHICLE
Original Filed Feb. 27, 1932   2 Sheets-Sheet 1
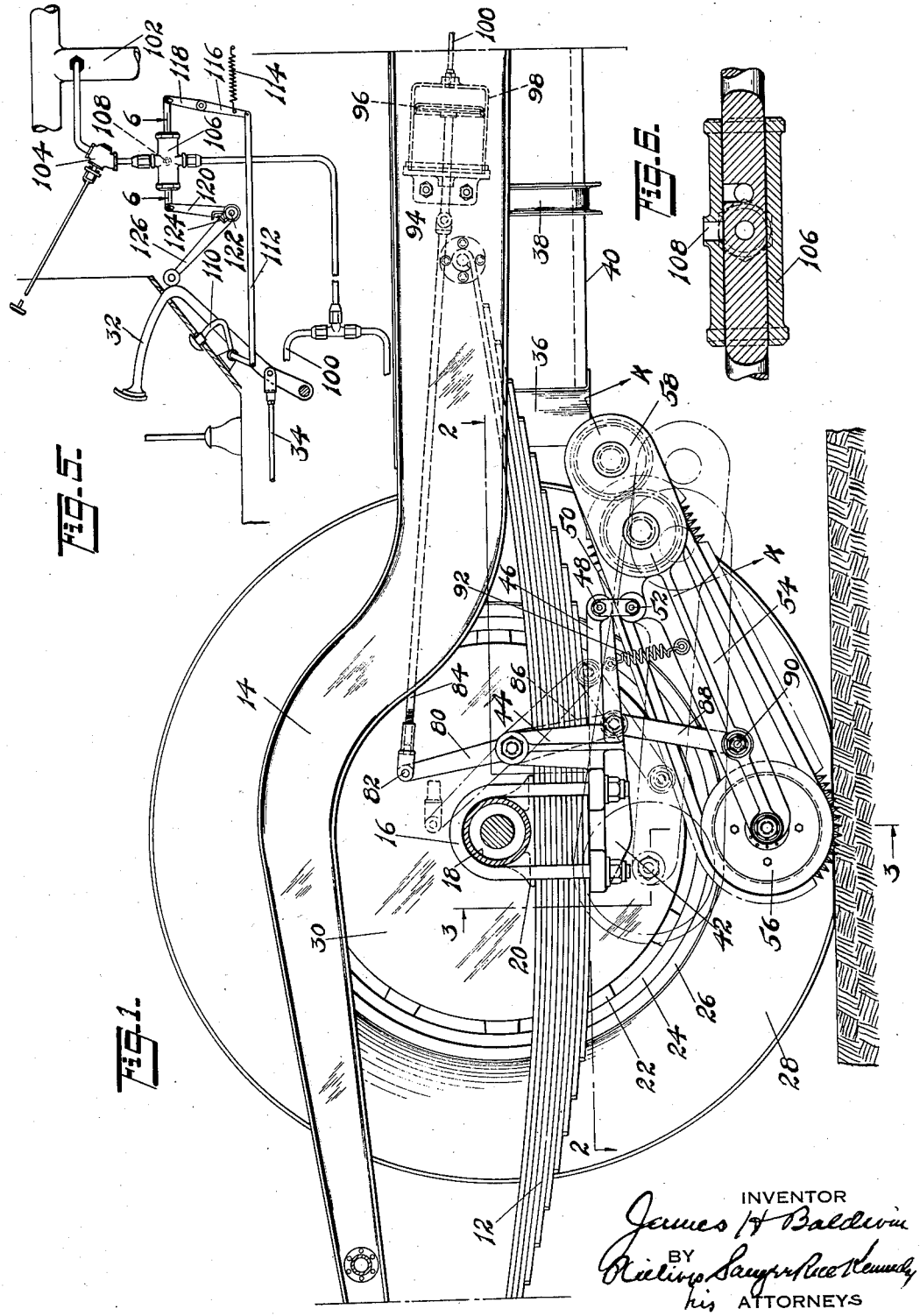
INVENTOR
James H Baldwin
BY
his ATTORNEYS

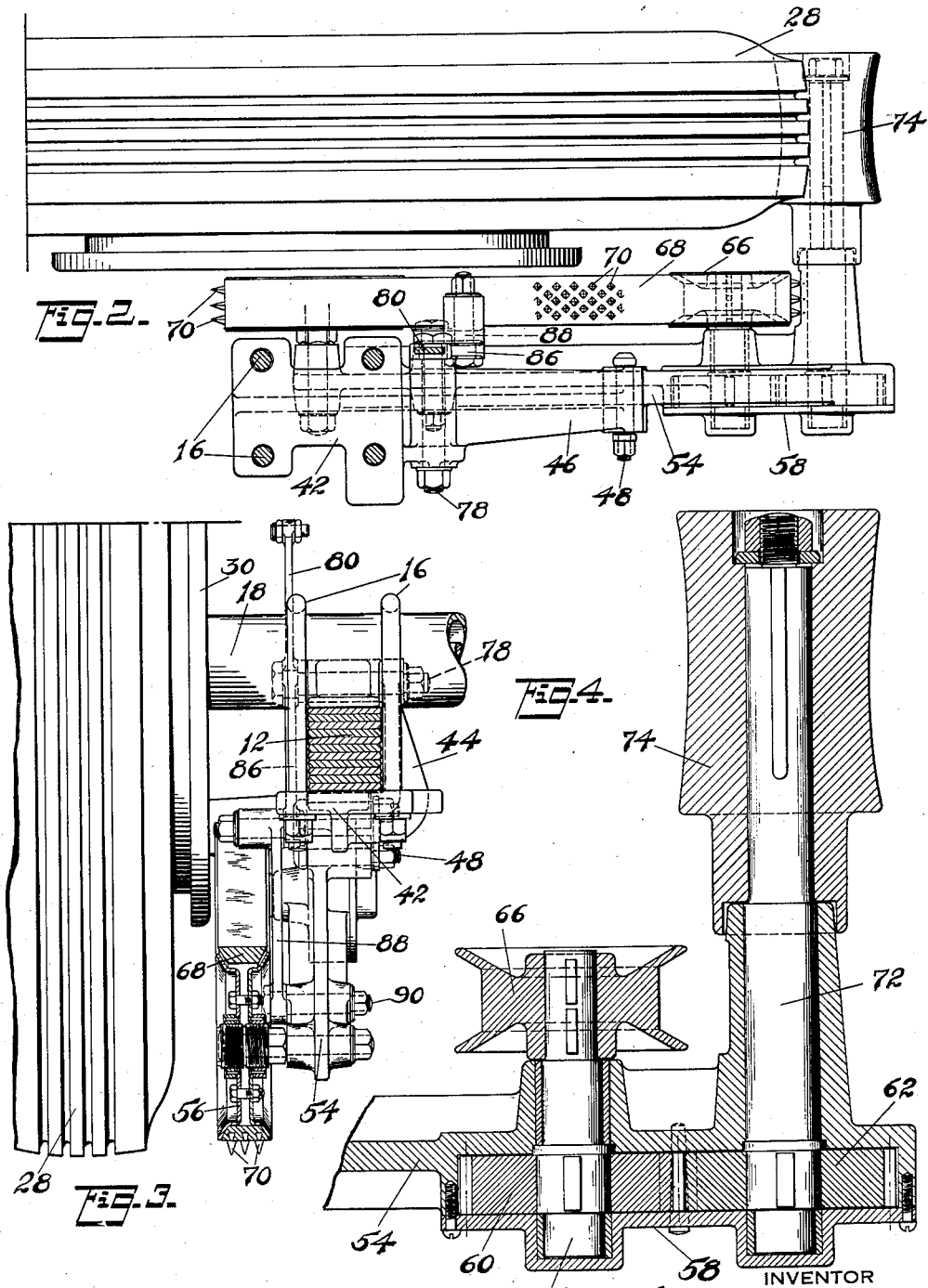

Patented May 28, 1935

2,002,518

UNITED STATES PATENT OFFICE 2,002,518

POWER DRIVEN VEHICLE

James H. Baldwin, New Milford, Conn.

Application February 27, 1932, Serial No. 595,479
Renewed October 16, 1934

7 Claims. (Cl. 180—15)

This invention relates to power driven vehicles and particularly to automobiles.

It is an object of the invention to provide an auxiliary ground gripping driving device whose peripheral velocity is always the same as that of the driving wheel of the vehicle with which the auxiliary driving device is associated.

A further object of the invention is to provide such a device which is movable out of and into ground contact opposite the portion of the driving wheel that is in contact with the ground, so that the three ground contacting portions respectively of the two vehicle driving wheels and the auxiliary ground gripping driving device will be substantially in alignment, with the result that when the auxiliary drive is in use, steering of the vehicle will not appreciably be affected.

Another object of the invention is to provide for the driving of the auxiliary device from the periphery of the associated driving wheel of the vehicle, so that where such wheel is provided with a pneumatic tire, the equalized peripheral velocity of said driving wheel and auxiliary device will be maintained regardless of variations in wear or air pressure within the pneumatic tire.

Another object is to provide for raising the auxiliary device out of ground contact to a height sufficient to enable it to clear the ground above the associated tire rim even when the tire is flat.

A still further object is to provide a control mechanism for the auxiliary drive, for moving it into and out of operative position, the control being effected by operation of the vehicle brake, the auxiliary drive being movable into operative position by actuation of the brake lever preferably in advance of the gripping action of the brakes, whereby the vehicle may avoid skidding.

An additional object of the invention is the provision of an auxiliary drive with means for locking it to a drive wheel of the vehicle so that the peripheral velocity of both will remain the same regardless of wear that may occur on either.

The invention includes mechanism for accomplishing the foregoing objects together with means for controlling the auxiliary device otherwise than by the brake, and for releasing it from association with the brake, as well as other means hereinafter more fully described.

Objects and advantages of the invention hereinabove not specifically set forth will appear from the following description taken in connection with the accompanying drawings which illustrate a preferred form of one embodiment of the invention and in which—

Figure 1 is a fragmentary side elevation, partly in section, showing the inner face of one of the rear driving wheels of an automobile;

Figure 2 is a top plan view, partly in section, on an enlarged scale, taken on the line 2—2 of Figure 1;

Figure 3 is an end elevation, partly in section, on the line 3—3 of Figure 1;

Figure 4 is a detailed sectional view on the line 4—4 of Figure 1, on an enlarged scale;

Figure 5 is a diagrammatic elevation of the controlling mechanism;

Figure 6 is a horizontal sectional view, on an enlarged scale, taken centrally through the cylindrical actuator valve of Figure 5.

Referring to the drawings, a composite leaf spring 12 is associated with the chassis side frame member 14. A pair of U-bolts 16 secure the axle housing 18 and saddle 20 to the leaf springs. The rear driving wheel is provided with spokes 22, wheel rim 24, tire rim 26 and pneumatic tire 28. A brake drum housing 30 is associated with the wheel in usual manner. The brake is operated in usual manner as by foot lever 32 and brake rod 34. The vehicle is shown as being provided with left rear fender 36 and supporting bracket 38 for the running board 40.

In the present embodiment of the invention, the movable frame which carries the auxiliary driving device is carried by a bracket 42 secured under the leaf springs 12 by U-bolts 16 and having the upwardly extending arm 44 and forwardly extending horizontal arm 46. At the forward end of arm 46 is located a shackle bolt 48 from which is suspended, by link 50 and a second shackle bolt 52, the frame 54 of the auxiliary driving device.

One end of the frame 54 carries the rotatable grooved pulley 56 and the other end of the frame is provided with a housing 58 within which are rotatably mounted meshing gears 60 and 62. The gear 60 is keyed on a short shaft 64 revolubly mounted in the frame 54 and to whose other end is keyed a grooved pulley 66. A beveled belt 68 connects the two pulleys 56 and 66 in driving relation and is provided on its outer face with ground grippers 70.

The gear 62 is keyed on shaft 72 which is rotatably mounted in frame 54 and has keyed to it a driving pulley 74 peripherally shaped for driving engagement with the periphery of pneumatic tire 28.

Referring to the means for moving the auxiliary device into and out of operative position, the upwardly extending bracket 44 carries a pivot bolt 78, with which is associated a lifting lever whose upper arm 80 is pivotally connected at 82 with the actuator rod 84 and whose lower arm 86 has pivotally attached thereto a link 88 whose lower end, in turn, is pivotally connected at 90 with the frame 54. Movement of the upper arm 80 to the dotted line position of Figure 1, that is, to the left as viewed in said figure, moves the upper portion of link 88 upwardly and to the right, thereby causing the lower end of frame 54 to lift and move out of ground contact the auxiliary drive. During this movement, the housing 58 of the frame moves downwardly to dotted line position and carries driving pulley 74 out of driving engagement with the periphery of the pneumatic tire. The movement described is aided by a coil spring 92 under tension and attached to bracket arm 46 and also to frame 54. The movement described is sufficient to lift the lower end of the auxiliary driving element high enough to clear the tire rim. When in lower or operative position the driving surface of the auxiliary element contacts with the ground, as shown in Figure 1, in line with the ground contacting area of the two rear driving wheels of the vehicle and, as a result, the steering of the vehicle is not appreciably affected.

The actuating rod 84 is pivotally attached at its forward end, as at 94, to a short piston 96 working in cylinder 98. When the piston 96 is in the forward position of Figure 1, the auxiliary device is in operative position, as shown. The piston, however, is normally to the left, as viewed in said figure, the frame being lifted by means of spring 92. The piston is moved to the right to bring the auxiliary device into operative position by reduction of air pressure in the cylinder 98 to the right of the piston, and for this purpose the right hand end of the cylinder is connected by a pipe line 100 to the intake manifold 102 of the internal combustion engine furnishing the motive power for the vehicle.

A manually controlled valve 104 may close off the cylinder 98 from communication with the intake manifold, and itself be operative from the instrument panel.

In accordance with the invention, the auxiliary driver may be operated by the brake lever and optionally, or, in addition thereto, may be operable without actuating the brake.

In the embodiment illustrated, located in the pipe line between the cylinder and the valve 104 is a valve casing 106 within which is reciprocally mounted a cylindrical valve of the type illustrated in Figure 6. In its right hand position it opens communication between the cylinder 98 and valve 104; in its left hand position it closes off the cylinder from communication with said valve and through a second passage places the cylinder in communication with the outside atmosphere through a relief port 108.

A foot actuated lever 110 may be operable through the floorboard, and when depressed, moves to the left a link 112 which draws to the left, against the action of a tensioned coil spring 114, the lower arm 116 of a pivoted lever whose upper arm 118 is slotted to receive a pin provided on the slide valve. The depression of the lever 110 thus moves the valve to right-hand position so that if the shut-off valve 104 is open air will be exhausted from the cylinder 98 to the right of the piston 96, thereby tending to straighten out the link 88 and its associated lever, which places the auxiliary driving element in contact with the ground and the driving pulley 74 in driving contact with the periphery of the pneumatic tire. The gripping drive element thereupon begins to function as an auxiliary drive with the same peripheral velocity as that of the pneumatic tire. When the foot lever 110 is released, coil spring 114 draws lever arm 116 to the right, whereupon the slide valve is moved to the left a sufficient distance to vent cylinder 98 to the outside atmosphere.

In this movement, however, the slide valve moves to the left and arm 120, which has slotted connection with the valve, moves about fixed pivot 122 increasing the tension of a coil spring 124 associated with the two arms 120 and 126. These springs act in opposition to each other and are so arranged that when the system is in equilibrium the cylinder 98 is vented to the outside atmosphere. In accordance with the invention, the arm 126, pivotally mounted on the axis 122, is arranged for association with a portion of the foot brake 32 so that when the foot brake lever is depressed the arm 126 will be cammed to the right, about its pivot 122, increasing the tension on spring 124 sufficiently to move the slide valve to the right, thereby placing the cylinder 98 in communication with the intake manifold 102, if the shut-off valve 104 is open and causing the auxiliary gripping drive to operate as before described, the parts being preferably so arranged that this auxiliary drive will commence to function before the brakes begin to function and thereby avoid the commencement of a skid that might otherwise occur when the braking action starts. Should the shut-off valve 104 be closed, however, the brake functions in customary manner without affecting the auxiliary gripping drive. Should the shut-off valve be closed and the vehicle begin to skid with or without the application of the brakes, the valve 104 may be opened and lever 110 operated to bring the auxiliary driving device into operation as hereinbefore described to stop the skidding. It is evident that when the auxiliary driving device is required to provide additional traction for propelling the vehicle, its operation may be affected through lever 110 rather than through the brake lever. The auxiliary device herein described is preferably provided for each of the rear or driving wheels of the vehicle, only one being illustrated as its description will suffice for both. The pipe line 100 is provided with a branch for the cylinder of the corresponding auxiliary device cooperating with the right rear vehicle wheel.

What is claimed is:

1. In a power driven vehicle, a pair of axially aligned wheels having ground contact, a gripper belt frame, belt rollers carried thereby, a gripper belt on said belt rollers, a power take-off roller in driving relation with the periphery of one of said wheels for driving one of said belt rollers, and mechanism for moving the belt frame to bring a portion of said belt into and out of ground contact in line with the ground contacting portions of said wheels.

2. In a power driven vehicle, a pair of axially aligned wheels having ground contacting tires provided with rims, and auxiliary mechanism including a pivotally mounted gripper belt frame, belt rollers carried thereby, a gripper belt on said belt rollers, a power take-off roller in driving relation with the periphery of one of said tires for driving one of said belt rollers, and mechanism for pivotally moving said gripper belt frame in one direction to bring a portion of said gripper belt into ground contact in line with the ground contacting portions of said wheels, and in the reverse direction to bring the lowest part of said auxiliary mechanism above the lowest part of the rim of its associated tire.

3. In a power driven vehicle, a pair of axially aligned wheels having ground contacting tires, a pivotally mounted gripper belt frame, belt rollers carried thereby, a gripper belt on said belt rollers, a power take-off roller carried by said frame in driving relation with the periphery of one of said wheels for driving one of said belt rollers, and mechanism for moving said gripper belt frame in one direction to bring a portion of said gripper belt into ground contact and said power take-off roller into driving engagement with the periphery of its associated wheel, and in the other direction to bring said gripper belt out of ground contact and said power take-off roller out of driving engagement with the periphery of its associated wheel.

4. In a power driven vehicle, a pair of axially aligned wheels having ground contacting tires, a bracket carried by said vehicle, a gripper belt frame, having link connection with said bracket, belt rollers mounted in said frame, a gripper belt on said belt rollers, a power take-off roller carried by said frame in driving relation with the periphery of one of said wheels for driving one of said belt rollers, and mechanism for moving said gripper belt frame in one direction to bring a portion of said gripper belt into ground contact and said power take-off roller into driving engagement with the periphery of its associated wheel, and in the other direction to bring said gripper belt out of ground contact and said power take-off roller out of driving engagement with the periphery of its associated wheel, said mechanism including a lever carried by said bracket, a link connecting said lever to said gripper belt frame, and a spring connecting said frame to said bracket and urging said belt frame towards inoperative position.

5. In a power driven vehicle, a pair of axially aligned driving wheels having ground contact, an auxiliary gripper device associated therewith including a roller driven by one of said wheels, belt rollers and a gripper belt thereon driven from said first-named roller, and mechanism for moving a portion of said gripper belt out of and into ground contact in line with the ground contacting portions of said driving wheels.

6. In a power driven vehicle, a pair of axially aligned driving wheels having ground contact, an auxiliary gripper device associated therewith including a roller driven by one of said wheels, belt rollers and a gripper belt thereon driven from said first-named roller, said belt being driven thereby at the same peripheral velocity as said wheel and having a gripping surface, and means for moving said gripper belt out of and into contact with the ground in line with the ground contacting portions of said driving wheels.

7. In a power driven vehicle, a pair of axially aligned driving wheels having ground contact, an auxiliary gripper device associated therewith including a roller driven by one of said wheels, belt rollers and a belt thereon having a studded ground gripping surface driven from said first-named roller at the same peripheral velocity as its associated wheel, and mechanism including a foot lever for moving a portion of said belt out of and into ground contact in line with the ground contacting portions of said driving wheels.

JAMES H. BALDWIN.